No. 746,960. Patented December 15, 1903.

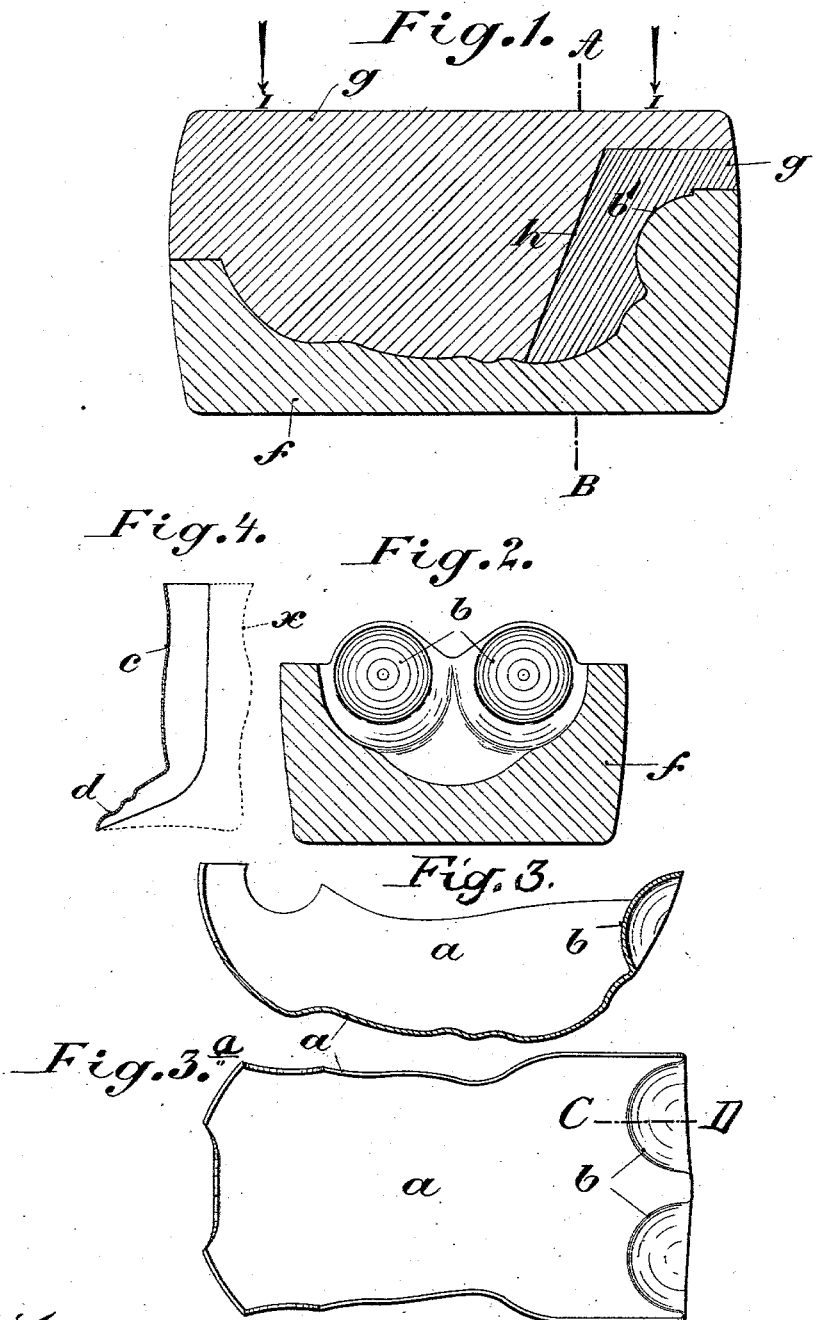

UNITED STATES PATENT OFFICE.

HANS HEINCKE, OF WALTERSHAUSEN, GERMANY.

MOLD.

SPECIFICATION forming part of Letters Patent No. 746,960, dated December 15, 1903.

Application filed May 11, 1903. Serial No. 156,715. (No model.)

*To all whom it may concern:*

Be it known that I, HANS HEINCKE, manufacturer, a subject of the Duke of Saxe-Coburg-Gotha, residing at Waltershausen, in the Duchy of Saxe-Coburg-Gotha, German Empire, have invented certain new and useful Improvements in Molds, of which the following is a specification.

My invention relates to molds for use in manufacturing parts of dolls and other articles by pressure.

Hitherto no mold has been used for manufacturing parts of dolls and other articles in which there was, together with the pressure-surface at an angle to the direction of pressure, another surface parallel to the said direction. A body of a doll had therefore to be made in three parts, independently of the arms and head sockets, as it was impossible by means of the usual two-part molds to form the hip-sockets, as the surface of pressure would have been parallel to the direction of pressure, and therefore it was impossible to exercise pressure in that direction.

Figure 1 is a vertical longitudinal section of a mold constructed according to my invention; Fig. 2, a cross-section on the line A B of Fig. 1; Fig. 3, a view illustrating the molded article in cross-section, taken on the line C D of Fig. 3ª; and Fig. 3ª is a top plan view of the molded article.

By means of the three-part mold according to this invention it is possible to make the body of a doll in two parts, as the half $a$ of the same, together with the hip-sockets $b$, (see Fig. 3,) can be made in one piece and in one mold. In the same way the front parts $c$ of the lower parts $x$ of the legs can be pressed out in one piece, with the foot $d$ (see Fig. 4) having the toes pressed in, which was impossible hitherto, as the foot $d$ is at an angle to the lower part $x$ of the leg.

The chief feature of the mold according to this invention for manufacturing parts of dolls and other articles is that it is made in three parts. The lower part $f$ of the mold has throughout the exact shape of the part to be produced, and has therefore pressure-surfaces arranged at an angle or angles to each other. The upper mold-block $g$ is made in two parts, and the joint-surfaces $h$ of these two parts are at an angle to the direction of pressure, so that when pressure is exercised on the upper double half $g$ of the mold the part which contains the pressure-surfaces $b$, which are substantially parallel to the direction of pressure I, is forced by a wedging action acting at an angle to the direction of pressure, and at the same time also parallel to it, against the lower half $f$ of the mold. In this way it is possible in a very simple manner to produce parts of dolls in a single mold, said parts having surfaces approximately or directly at an angle to each other, so that various parts of dolls or other articles which, owing to their angular shape, had to be made in several parts can be made in one piece and by means of only a single mold, whereas hitherto such parts required two molds on account of the two parts arranged at an angle to each other.

The manufacture of parts of dolls or other articles in the new mold is carried out in the usual manner. The mold is heated, and the material—say cardboard—after having been cut or stamped out to the desired outline is moistened and placed in the lower half $f$ of the mold, and the upper half $g$ of the mold, made in two parts, is pressed down firmly in the direction of the arrow I.

Having now particularly described and ascertained the nature of my said invention and in what manner the same is to be performed, I declare that what I claim is—

1. A mold comprising a base and an upper part fitting within the base, said upper part consisting of two engaging sections, the plane of engagement between said two upper sections being at an obtuse angle.

2. A mold for use in manufacturing dolls, comprising a base having its pressure-surface formed throughout in the exact shape of the part to be produced, one wall of said pressure-surface being parallel to the direction of downward pressure, and an upper part, a block between the base and the upper part, the abutting surfaces of which are at an obtuse angle to the direction of pressure to enable pressure to be exerted against the wall, whose pressure-surface is parallel to the direction of downward pressure.

In testimony whereof I have hereunto set my hand in presence of two subscribing witnesses.

HANS HEINCKE.

Witnesses:
  OLGA HINZE,
  MAX SCHUSTER.